(12) United States Patent
Chien et al.

(10) Patent No.: US 8,564,750 B2
(45) Date of Patent: Oct. 22, 2013

(54) LIQUID CRYSTAL ALIGNMENT USING INKJET PRINTED POLYMERS

(75) Inventors: Liang-Chy Chien, Hudson, OH (US); Jeoung Yeon Hwang, Kent, OH (US)

(73) Assignee: Kent State University, Kent, OH (US)

( * ) Notice: Subject to any disclaimer, the term of this patent is extended or adjusted under 35 U.S.C. 154(b) by 237 days.

(21) Appl. No.: 12/167,754

(22) Filed: Jul. 3, 2008

(65) Prior Publication Data

US 2010/0002177 A1    Jan. 7, 2010

(51) Int. Cl.
*G02F 1/1337*    (2006.01)

(52) U.S. Cl.
USPC .......................................... 349/124; 349/127

(58) Field of Classification Search
None
See application file for complete search history.

(56) References Cited

U.S. PATENT DOCUMENTS

| | | | |
|---|---|---|---|
| 6,195,146 B1 | 2/2001 | Chaudhari et al. | |
| 7,609,356 B2 * | 10/2009 | Liao et al. | 349/156 |
| 7,686,410 B2 * | 3/2010 | Yun et al. | 347/12 |
| 2008/0062376 A1 * | 3/2008 | Ko et al. | 349/189 |
| 2008/0088782 A1 * | 4/2008 | Jung et al. | 349/124 |
| 2010/0067912 A1 * | 3/2010 | Khan | 398/83 |

OTHER PUBLICATIONS

J. L. Janning, "Thin Film Surface Orientation for Liquid Crystals", Appl. Phys. Letter, 1972, pp. 173-174, vol. 21.

A. M. Lackner, J.D. Margerum, L.J. Miller, W.H. Smith, Jr., "Photostable Tilted-Perpendicular Alignment of Liquid Crystals for Light Valves", Proceeding of the SID Digest, 1990, pp. 321-326, vol. 31.

W.M. Gibbosons, P.J. Schannon, S.T. Sun, B.J. Swetlin, "Surface-mediated Alignment of Nematic Liquid Crystals with Polarized Laser Light", Nature, 1991, pp. 49-50, vol. 351.

M. Schadt, K. Schmitt, V. Kozenkov, V. Chigrinov, "Surface-Induced Parallel Alignment of Liquid Crystals by Linearly Polymerized Photopolymers", Jpn. J. Appl. Phys., Part 1, No. 7, Jul. 1992, pp. 2155-2164, vol. 31.

M. Schadt, H. Seiberle, A. Schuster, "Optical Patterning of Multi-Domain Liquid Crystal Displays with Wide Viewing Angles", Nature, 1996, pp. 212-215, vol. 381.

P. Chaudhari, J.A. Lacey, S.C.A. Lien, J.L. Speidell, "Atomic Bean Alignment of Liquid Crystals", Jpn. J. Appl. Phys., 1998, p. 55, vol. 37.

P. Chaudhari et al., "Atomic Bean Alignment of Inorganic Materials for Liquid-Crystal Displays", Nature, 2001, pp. 56-59, vol. 411.

B.J. Gans et al., "Inkjet Printing of Polymers: State of the Art and Future Developments", Advanced Materials, 2004, pp. 203-213, vol. 16.

D.B. Chrisey, "The Power of Direct Writing", Science, 2000, p. 897, vol. 289.

(Continued)

*Primary Examiner* — Hemang Sanghavi
(74) *Attorney, Agent, or Firm* — Hahn Loeser + Parks LLP; Scott M. Oldham, Esq.

(57) ABSTRACT

A method of preparing liquid crystal alignment films using an inkjet printer to control liquid crystal alignment is disclosed. The alignment ink is formulated from a single alignment material or combination of alignment materials to realize desired pretilt angle. The alignment films can be applied with designed patterns of alignment films of different pretilt angle on at least one substrate to achieve pattern-aligned liquid crystal devices.

18 Claims, 18 Drawing Sheets

(56) References Cited

OTHER PUBLICATIONS

T. Shimoda et al., "Multicolor Pixel Patterning of Light-Emitting Polymers by Ink-Jet Printing", SID 99 Digest, pp. 376-379.

H. Kobayashi et al., "A Novel RGB Multicolor Light-Emitting Polymer Display", Synthetic Metals, 2000, pp. 125-128.

K. Hiruma et al., "Ink Jet Fabrication of Alignment Layers on High-Temperature Polysilicon Liquid Crystal Panels", SID Technical Digest, 2006, pp. 1583-1586.

S. Varghese et al., "High Pretilt Four-Domain Twisted Nematic Liquid Crystal Display by Micro-Rubbing: Process, Characterization, and Optical Simulation", J. Appl. Phys., 2005, pp. 53101-1-53101-8.

* cited by examiner

FIG. 10a
FIG. 10B
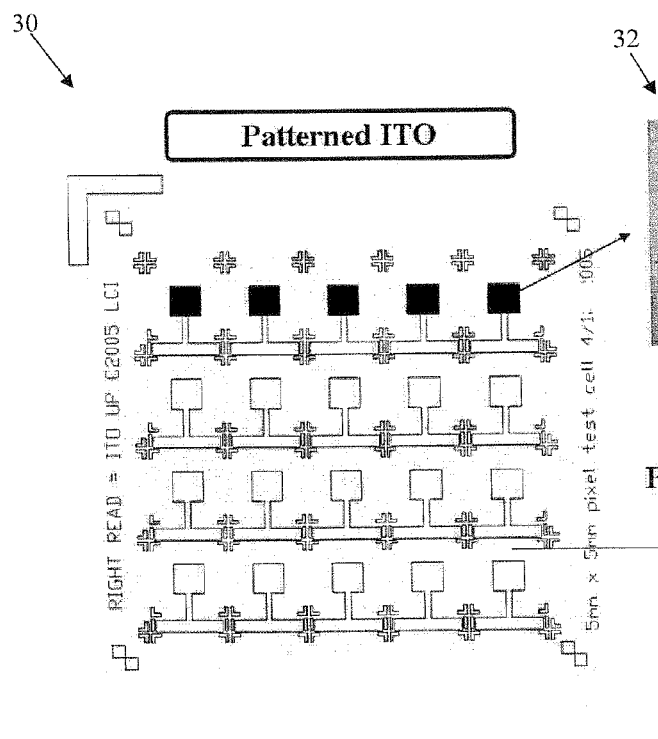
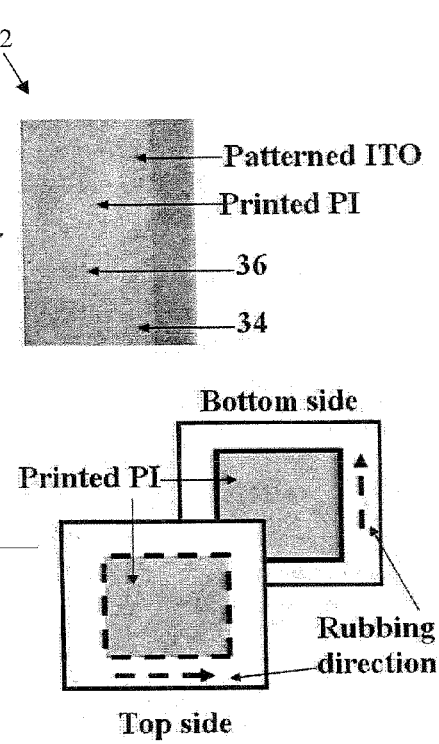

LIQUID CRYSTAL ALIGNMENT USING INKJET PRINTED POLYMERS

GOVERNMENT SUPPORT

The U.S. Government has a paid-up license in this invention and the right in limited circumstances to require the patent owner to license others on reasonable terms as provided for by the terms of contract/grant no. FA9550-05-C-0036 awarded by the U.S. Air Force Research Laboratory.

FIELD OF THE INVENTION

The invention relates to a non-contact alignment method for liquid crystals. More particularly, the invention relates to a non-rubbing alignment method for liquid crystals made with an inkjet printing technique on a substrate. Even more particularly, the invention relates to the production of alignment layers for planar, tilt and homeotropic liquid crystal alignment utilizing a non-rubbing alignment method with an inkjet printing technique.

BACKGROUND OF THE INVENTION

Alignment of the liquid crystal director is important for many liquid crystal applications. Most field effect liquid crystal displays (LCDs) today use alignment layers to achieve high contrast ratio and maximum brightness. Currently, the predominated alignment technique is mechanical rubbing in which a substrate is coated with a thin polymer film and then buffed with cloth to control the direction of liquid crystal on the substrate surface. Typically, a polyimide is employed as a liquid crystal alignment layer. The liquid crystal alignment process requires the deposition of a thin polymer layer of a polyimide precursor, for example polyamide acid, and then cured. The polymer surface is then rubbed in one uniform direction to give a homogeneous disposition. The rubbing process also generates the so-called "pre-tilt" angle. The pretilt angle is important in various optical effects and switching mechanisms of nematic devices is associate with the nature of molecular structure of the polyimide. The advantage of this method is that it is suitable for mass production. However, the rubbing method has certain drawbacks including the production of dust and electrostatic charges, which is particularly disadvantageous for manufacturing high performance liquid crystal displays. Thus, a non-contact alignment technology would be highly desirable for use in manufacturing future generations of large, high-resolution LCDs and other liquid crystal technology.

Yet anther method for forming an alignment layer on a substrate is deposition by an oblique angle through evaporation of $SiO_2$ for homogeneous alignment. This deposition method has proven to be cumbersome and complicated in the mass production of high-resolution LCDs. With these restrictions, finding a new alignment technique which would enable the control of pretilt angle and spatial resolution would have a major impact on existing liquid crystal technologies as well as provide a means for realizing new liquid crystal devices.

Liquid-crystal photoalignment, another non-rubbing liquid-crystal alignment method, has been developed for fabricating LCDs, where the substrates are photo-buffed to generate surface anisotropy and pretilt angle. This technique avoids many drawbacks of the traditional rubbing technique for liquid crystal alignment, such as sample contamination and electrostatic charge generation. Typically, liquid crystal photoalignment technique uses films of photo-cross-linkable polymers cured with linearly polarized ultra-violet light. Photodimerization, appearing in such polymer films upon illumination with linearly polarized UV light, leads to the generation of surface anisotropy and unidirectional liquid crystal alignment. In this alignment technique, the induced liquid crystal alignment aging with time is a common problem, which normally causes an imaging sticking problem.

Another non-contact alignment method using a low-energy ion beam aligned liquid crystal with diamond-like carbon film has been developed. The mechanism of alignment is due to the order induced by exposing the inorganic or organic material to the ion beam by selectively destroying the randomly arranged aromatic rings of diamond-like carbon atoms. The products of these reactions change boundary conditions. Subsequent improvements related to using ion beam alignment with various alignment materials, gas, feed, etc. were also developed. Although low-pretilt liquid crystal alignment can be easily produced using the ion beam alignment, high-pretilt alignment is realized only for the limited class of materials with low reproducibility. In addition, liquid crystal alignment deteriorates because of aging from the destructive process.

Inkjet printing is a known process that is both cost effective and simple. Inkjet technology provides a low cost, high speed, non-contact, and environmentally friendly process. Recently, much effort has been invested in turning inkjet printing into a versatile tool for various industrial manufacturing processes in order to accurately deposit a minute quantity of material on a substrate. For example, Seiko Epson, a pioneer company in consumer inkjet printers, has been conducting extensive research into industrial inkjet applications with the goal of applying the company's proprietary MicroPiezo® print head technology to mass production. Most recently, in an attempt to save the cost in mass production of LCDs, a method of combining the inkjet printing of a polyimide layer and rubbing the surface for liquid crystal alignment has been reported. Although the inkjet printing offers some advantages including a smooth and uniform alignment layer, the required rubbing step still diminishes the contribution and causes the same drawbacks including the production of dust and electrostatic charges.

Another micro-rubbing technology, with atomic force microscopy (AFM) tip on the alignment layer has been studied. This direct writing method has proven to be good for lab-scale investigation but not suitable in mass production. The limitations of AFM micro-rubbed technique for LC alignment are speed and size of the alignment. In light of the forgoing, the problems described in the above alignment methods need to be overcome, and there thus is a need for a new and effective alignment method for use in for future generations of large, high-resolution LCDs and other liquid crystal technologies.

SUMMARY OF THE INVENTION

In one embodiment of the invention, a non-contact method of preparing an alignment film for a liquid crystal material is disclosed. The method includes the steps of providing at least one clean substrate on a moveable surface, providing a polymer ink solution having a predetermined viscosity and concentration in an inkjet cartridge, inserting the inkjet cartridge into an inkjet printer, printing at least one layer of the polymer ink solution onto the substrate with the inkjet printer to form a printed polymer ink layer having a predetermined thickness, and curing the printed polymer ink layer to form a non-contact alignment layer on the printed substrate. Additionally, air-assisted alignment may be provided by printing on the printed polymer ink layer using an empty cartridge printing, with air blowing from the nozzle of the ink cartridge producing induced anisotropy on the printed polymer ink layer. In an alternate embodiment, a method for producing uniform liquid crystal alignment in a liquid crystal cell comprises the steps of providing a substrate, and printing at least one layer of a polymer ink solution onto the substrate with a printer to form a printed polymer ink layer having a predetermined thickness. Air is then blown upon the printed polymer ink layer to produce induced anisotropy on the printed polymer ink layer. Using the substrate in a liquid crystal cell provides alignment of liquid crystals in the liquid crystal cell.

In another embodiment the method further includes forming a liquid crystal cell assembly, wherein the liquid crystal cell assembly comprises a plurality of spaced apart printed substrates aligned in a predetermined fashion, and loading a liquid crystal material into the liquid crystal cell assembly.

In yet another embodiment of the invention, a liquid crystal cell includes a plurality of spaced-apart substrates, wherein each substrate has a first side and a second side, a non-contact alignment layer printed and cured on at least the first side of each of the substrates, and at least one liquid crystal material contained with the spaced-apart substrates.

BRIEF DESCRIPTION OF THE DRAWINGS

FIG. 10a shows a schematic illustration of a liquid crystal a test cell according to an example.

FIG. 10b shows a printed ITO portion of the test cell shown in FIG. 10a.

DETAILED DESCRIPTION OF THE INVENTION

The aligning of substrates for uniform alignment of liquid crystals, including planar, tilt and slightly tilted homeotropic, is provided. In particular, liquid crystal alignment is achieved by depositing at least one liquid crystal alignment layer, such as an organic film, through the use of printing techniques, such as inkjet printing. The liquid crystal alignment layer is prepared from a polymer ink solution, such as a polyimide solution. The alignment layer provides for production of an aligning substrate for uniform alignment of liquid crystals (planar, tilt, and slightly tilt hometropic for example). The method allows for the axis (direction of preferable molecular orientation) confined to the direction of the printed alignment film. The alignment layer may be formed by printing one or more layers in sequence to induce a specific alignment structure, such as a multi-domain aligned structure, to enhance the homogenous, or self-compensate, the retardation in a liquid crystal cell structure. The methods may produce alignment structures for various applications, such as polarizers, optical compensators, integrated optical components and others. The alignment structure may allow effective control of the optical axis orientation of liquid crystals for such applications. Substrates include rigid or flexible materials, and the methods allow for production of the alignment structures using a continuous process, such as roll-to-roll processes, and can allow production of different optical components on a single fabrication line. Patterned alignment for multi-domain liquid crystal cells can also be produced.

Figure 1:
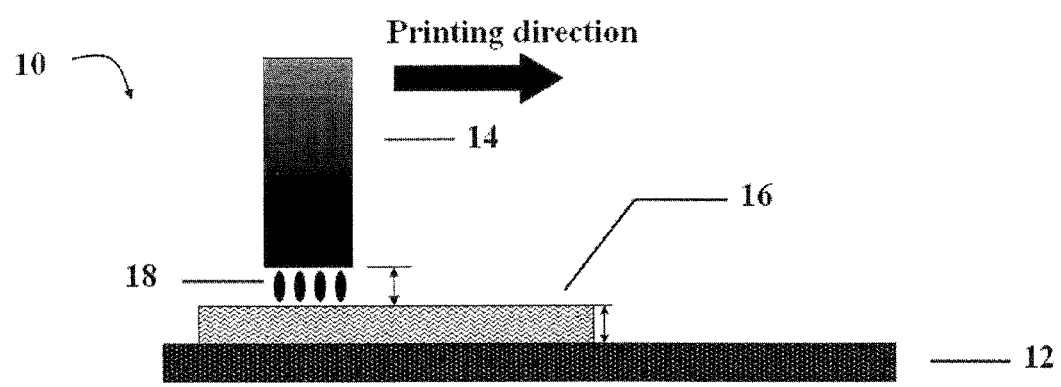
FIG. 1 is a schematic illustration of the inkjet printing apparatus.

As shown in FIG. 1, a side view of an inkjet printer system 10 schematically illustrated with components and parameters involved in printing. Inkjet printer system 10 further includes a X-Y stage or stationary support 12, a printer cartridge 14, and a rigid, flexible or softer substrate 16, wherein printer cartridge 14 is capable of dispensing a volume of alignment ink solution 18 to form an alignment layer on substrate 16. In the inkjet process, the alignment layer is formed by a piezo-driving waveform printed on substrate 16 by optimizing the viscoelasticity of alignment layer solution 18, the firing voltage, number of inkjet nozzles (volume of jetted fluid), and height between the print cartridge 14 and substrate 16. The alignment solutions, for example, can be prepared by diluting the available commercially Nissan Chemical polyimides PI-SE2170 (for ~5° pretilt LC alignment) and PI-SE1211 (for homeotropic alignment) solutions to an appropriate viscosity and concentration. Various mixtures of PI 5E-2107 and 5E-1211 can be prepared at the ratios of 1:1, 5:1, 10:1, and 20:1 for obtaining desired pretilt angle of LC alignment for example. The thickness of the printed polyimide layer can be controlled by adjusting the firing voltage (between 10V to 40V), the concentration of polyimide solution, the injection volume, number of nozzle for injection, and the firing voltage of injection.

Figure 1A:
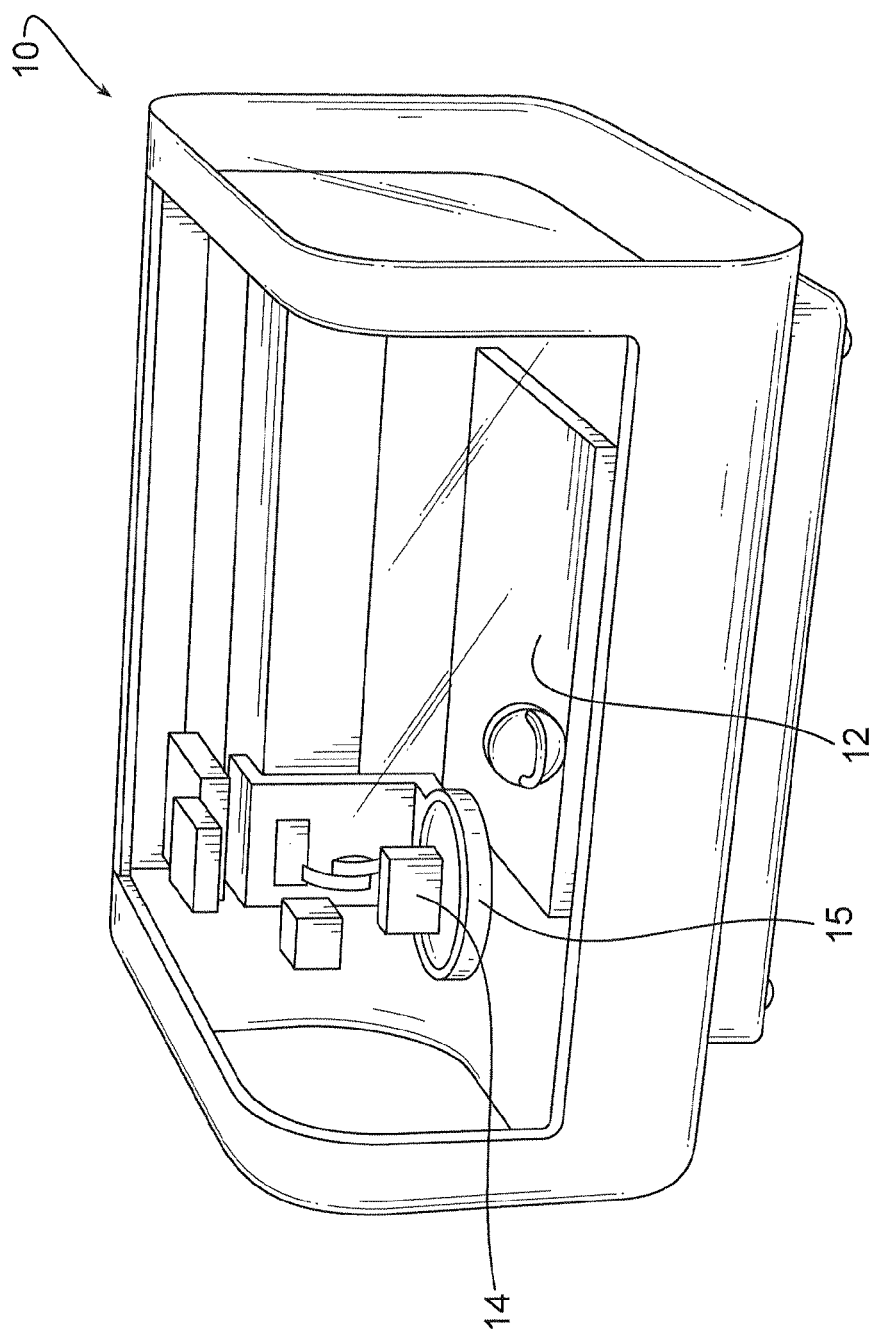
FIG. 1a shows an example of a printing system for use in the invention.

As shown in FIG. 1a, an example of the inkjet printing system 10, may provide an X-Y stage 12 with the print head 15, which has the ability to print lines, dots and/or mixed patterns. The system may be interfaced to a computer operating system, such as a PC-user interface. The system 10 in this example is self-contained and easily used to provide a ready-to-go system for production of alignment layers in association with LC devices, and/or possibly other structures of the LC devices. The printer cartridge 14 may be user-fillable, and the system allows cartridges 14 to be changed. In one example, a Dimatix 2800 series MEMS-based piezo-cartridge printer can be used to dispense the alignment solutions. Such a printer head provides piezo drop-on-demand properties, and is easily interchangeable. The print cartridge 14 could also be provided on a rotating carriage for variable print spacing, and may have tunable jetting electronics for different alignment solutions and/or solvents, aqueous solutions, UV curing materials, conductive inks or the like. For example, the alignment films may be made by the deposition of the alignment "ink", that may comprise a polyimide either in the form of PI-precursor or solvent-soluble pre-cured PI. The polyimide "ink" may be selected specifically for homogeneous, high pretilt, low-pretilt homeotropic or homeotropic alignment or mixture of any of these materials. It is another aspect of this invention that the inkjet printed and cured alignment films provide the uniaxial orientation for liquid crystal alignment. A further aspect of the present invention is to provide alignment film with micro patterns made by a programmed printing to create a multi-domain structure. Still further aspects of the invention are achieved by a method for fabricating an alignment film, including the multiple deposition of alignment film comprising two or more layers or microstructures, using a printing technique. The inkjet printed alignment films can also function as the optical compensation films. The polyimide concentration is dependent upon the type of inkjet printer as well as the amount of polyimide used. The range of polyimide can range from about 0.5% to about 2% solids in solution for example. The printer cartridge 14 may provide printing of desired size drops of the alignment solution, such as 10 picoliter drops of alignment solution. The driving waveform associated with the printer cartridge may be adjusted for producing droplets of desired configuration.

As seen in FIG. 1, during the inkjet printing process, the volume of alignment solution 18 dispensed onto substrate 16 is optimized by controlling the total number of drops of alignment solution 18 in each printed line, dot or mixed patterns on substrate 16 as well as optimizing the clearance 20 between the cartridge 14 and substrate 16. The clearance 20 between the cartridge 14 and substrate 16 as well as the volume of alignment solution 18 are adjusted as desired to deliver the appropriate amount of solution 18 onto substrate 16 during the printing process.

Figure 2:
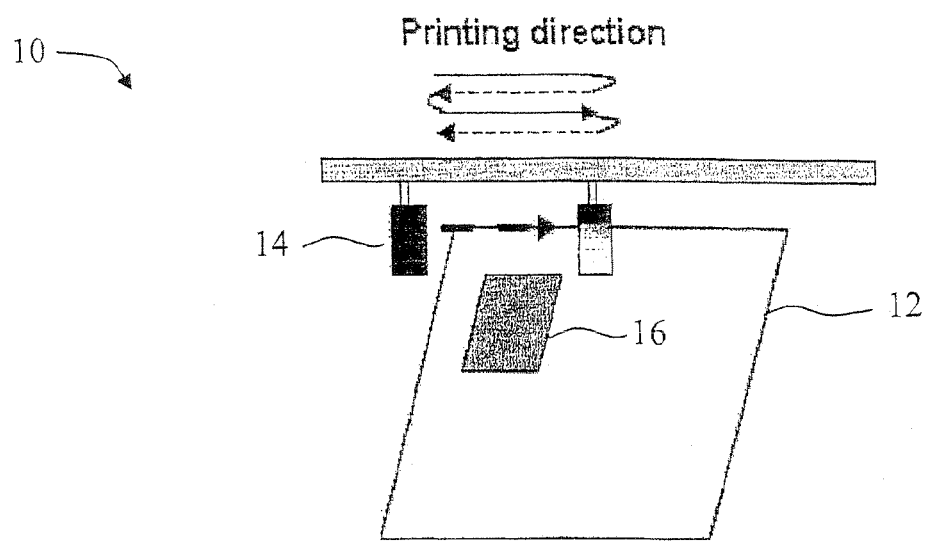
FIG. 2 shows the process of inkjet printing alignment layer.

As seen in FIG. 2, an example of the principle of operation of the computer controlled inkjet printing polyimide alignment layer is illustrated. The polyimide ink solution is printed in a predetermined direction as indicated by the filled line and direction of the arrow. In one embodiment, the polyimide ink solution is printed in a uniaxial direction. In another embodiment, the polyimide ink solution is printed in a direction that traverses in a first direction (solid lines) across substrate 16 which is placed on stationary or X-Y stage 12. Since the nozzles of cartridge 14 are in an array parallel to the direction of printing, the inkjet is stopped for printing on the second direction (dash lines), i.e. return routes, to prevent the alignment layer giving an orientation opposite to that of the neighboring printed area.

The printing of the LC alignment layer is therefore non-contact, and therefore free of generating dust and/debris, and also does not generate electrostatic charges due to rubbing.

The system 10 allows flexible control of pretilt angle of the alignment layer via the solution mixture and viscosity of the polyimide materials, as well as the control of the printing speed and jetted volume of solution. The system 10 is suitable for continuous fabrication processes, and efficiently uses the polyimide materials in a cost effective process without waste of material. The following examples provide indicative methods and procedures for carrying out the invention, but are only examples, and other procedures may be employed or certain procedures omitted if desired. In these examples, pre-imidized polyimides may be selected for low temperature curing, but other materials may be suitable. One or more polyimides may be used in the alignment solution. Further, substrate cleaning may be employed for preparation of the substrate, and any suitable techniques may be employed, or such preparations may not be necessary.

Example 1

Figure 3A:
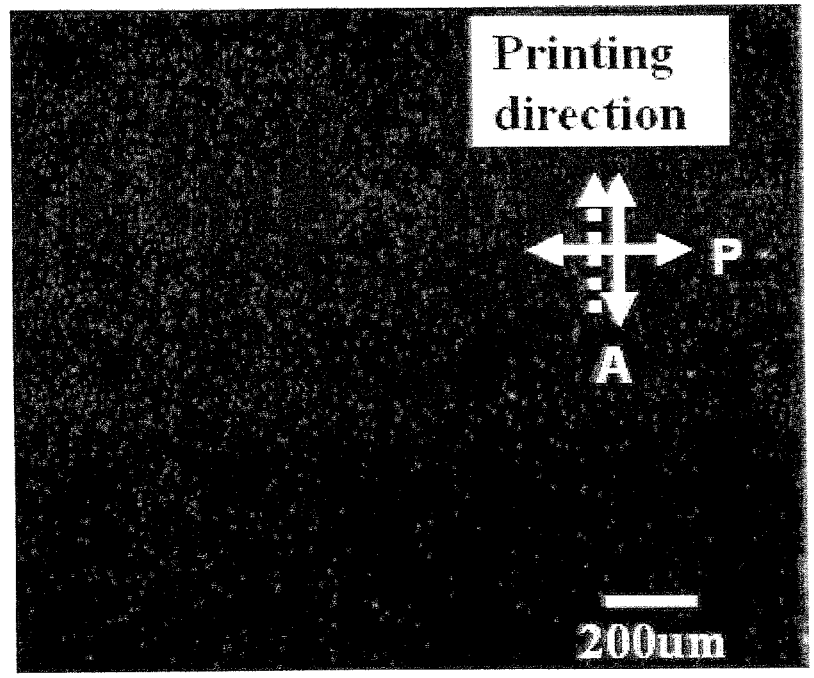
FIG. 3a shows the photomicrographs of a cell having the printed polyimide substrates assembled in an anti-parallel fashion and viewed through crossed polarizers, parallel to one of the polarizes and at 45 degree to the crossed polarizers.
Figure 3B:
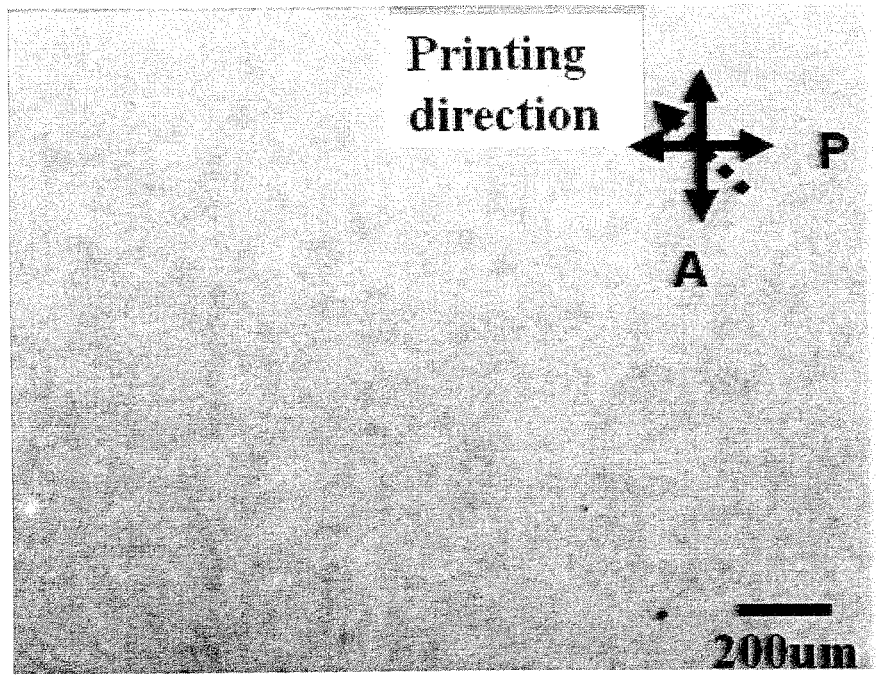
FIG. 3b shows the photomicrographs of a cell having the printed polyimide substrates assembled in an anti-parallel fashion and viewed through crossed polarizers at 45 degree to the crossed polarizers.

A substrate with an indium-tin oxide (ITO) conductive electrode overcoat is plasma-treated for about 5 min. at the incident angle 0° with respect to UV is placed on the stage and steadily withheld by vacuum. Other incident angles may be used, such as up to 75° for example. The polyimide solution of about 0.8 wt % SE-2170 and about 0.008 wt % of a 3M surfactant FC4430 was prepared to give a solution with viscosity of about 22 cps. The added surfactant was to keep the film/air interface level during the evaporation of solvent which to facilitate liquid crystal alignment. The polyimide solution was printed with firing voltage 10V and gap 20 between cartridge and substrate was adjusted to about 200 um. The thickness of the alignment film determined by an AlphaStep 200 Profilometer is about 100 Å. The inkjet printed film was pre-baked at 100° C. for 3 minutes to remove excess solvent and post-cured at about 180° C. for one hour. As will be described hereafter, the substrate with the printed polyimide (PI) film was cured and then may be subjected to a further alignment method by overprinting the printed PI film using an empty printing cartridge. The distance between the substrate and empty cartridge is optimized, and overprinting is performed with a higher firing voltage, such as 40 v. which ejects air at the substrate. As a result, the blowing effect with a strong air current on the printed PI film resulted in the creation of nano-scale grooves in the printed PI film for enhancing LC alignment. The printed substrates were assembled in an anti-parallel fashion with respect to the printing direction. A nematic liquid crystal E31 (from Merck) was loaded into the cell with about 22 μm cell gap to examine the alignment effect of printed polyimide. The photomicrograph of the liquid crystal cell viewed through crossed polarizers with the rubbing direction parallel to a polarizer, as seen in FIG. 3a, shows a dark image, while the image of the LC cell shows a maximum light transmission, as seen in FIG. 3b, with the printing direction at 45° angle between the crossed polarizers.

Example 2

Figure 4A:
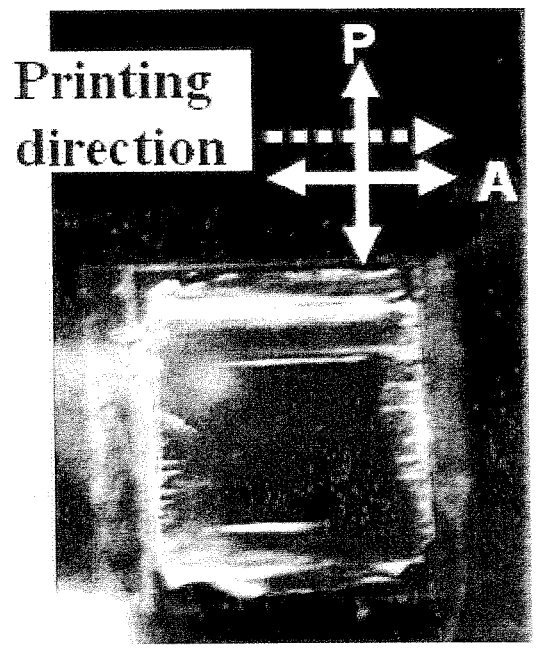
FIGS. 4a and 4b show the photos of the corresponding cell of FIGS. 3a and 3b.
Figure 4B:
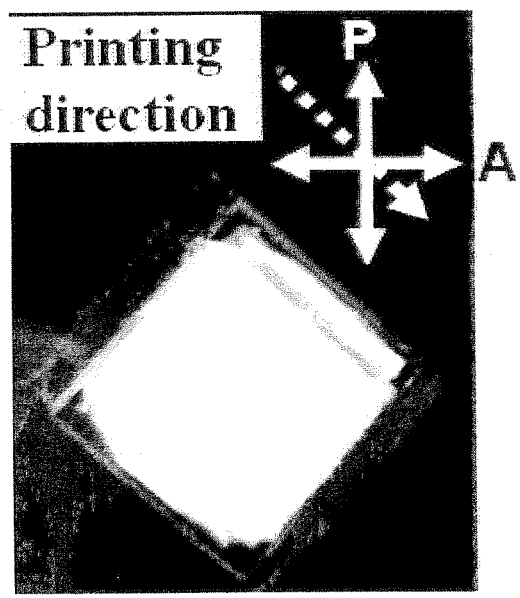

A liquid crystal cell was made by the sequence of procedure the same in the Example 1 except changing the print height (gap 20 between cartridge and substrate) to about 0.76 mm. As a result, the photomicrographs shown in FIGS. 3a and 3b indicate good alignment of the dark and bright states. The obtained good alignment of the liquid crystal cell is shown in FIGS. 4a and 4b.

Example 3

Figure 5A:
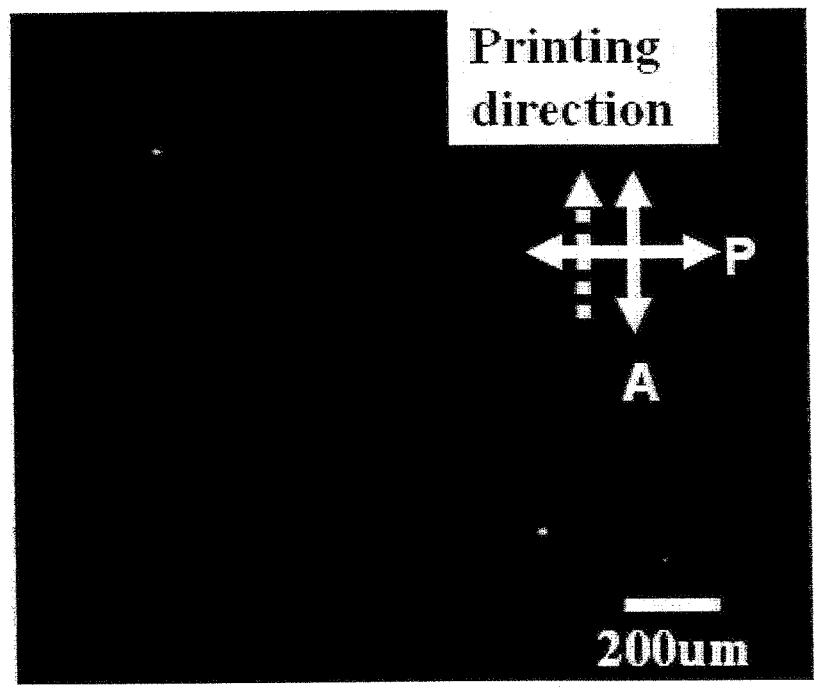
FIGS. 5a and 5b show the photomicrographs of a cell with quality planar alignment having a negative dielectric anisotropy LC.
Figure 5B:
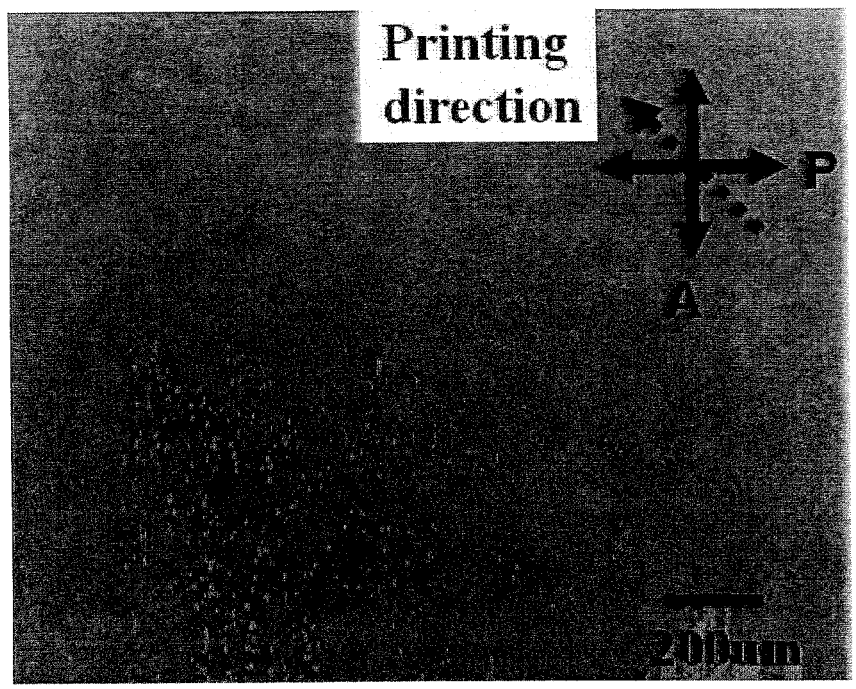
Figure 6A:
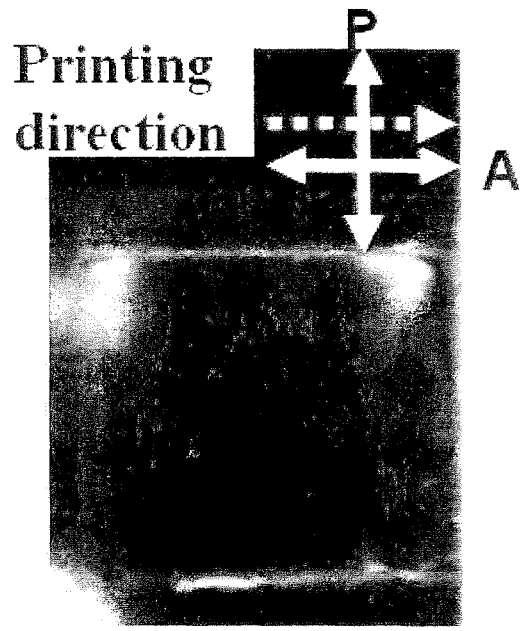
FIGS. 6a and 6b show the photos of the corresponding cell of FIGS. 5a and 5b.
Figure 6B:
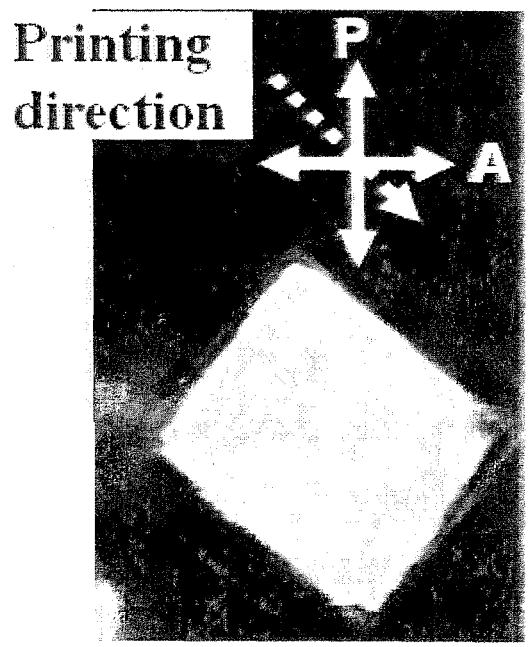

A liquid crystal cell was made by the sequence of procedures which were the same as in the Example 2 except changing the liquid crystal to ZLI 2806 (Merck). The photomicrographs shown in FIGS. 5a and 5b indicate good alignment for the liquid crystal cell as shown in FIGS. 6a and 6b.

Example 4

Figure 7A:
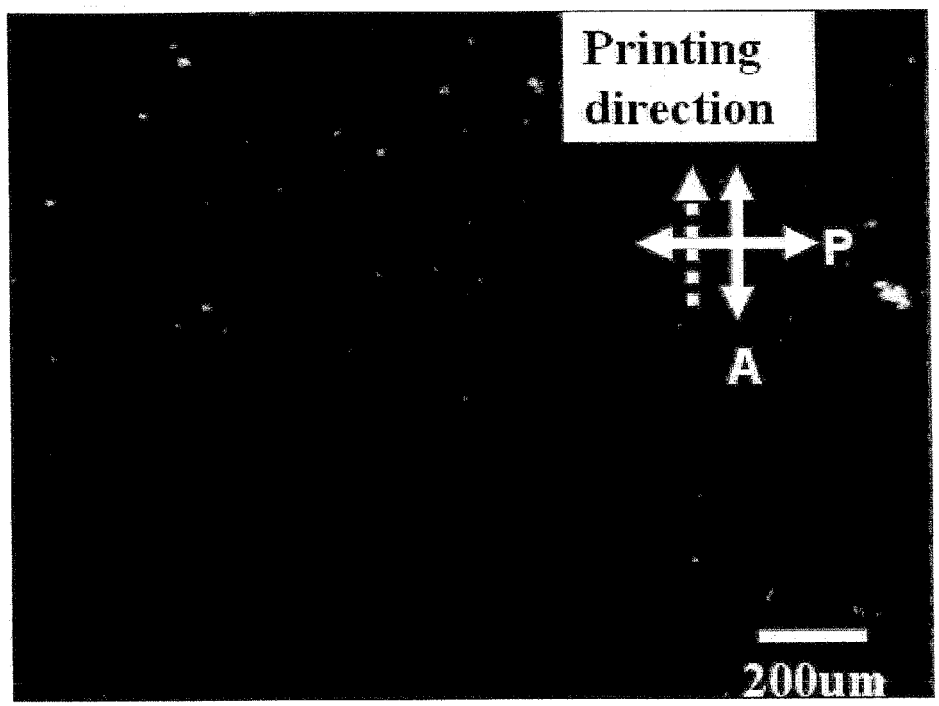
FIGS. 7a and 7b shows the photomicrographs of a cell with quality alignment prepared from a mixture of polyimides (SE-2170/SE 1211=20:1) having a tilted alignment.
Figure 7B:
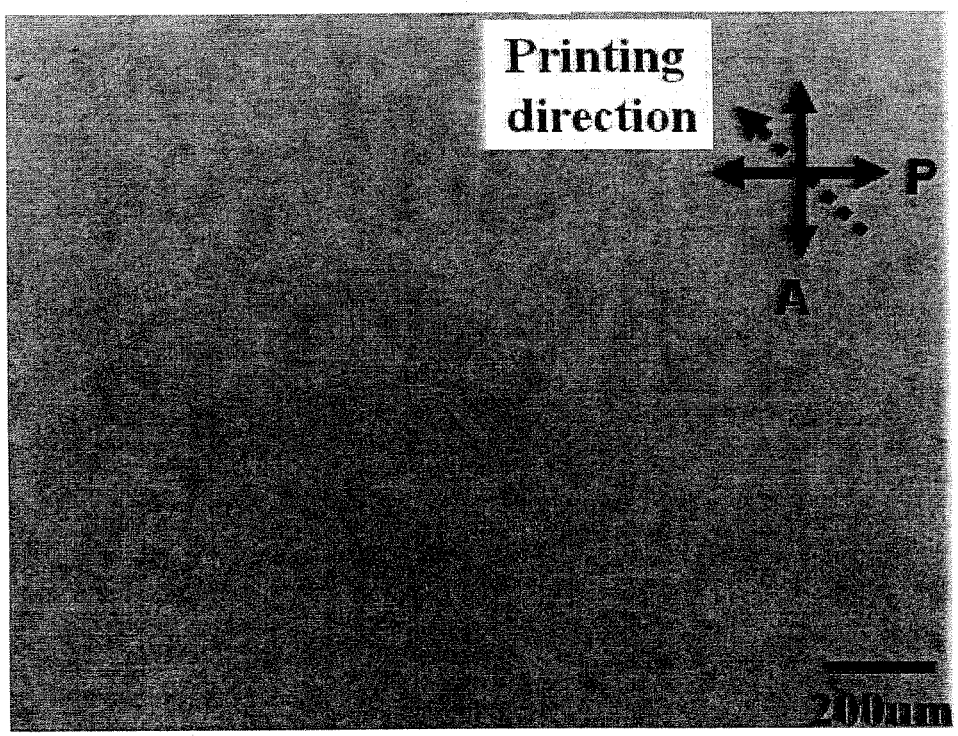

A liquid crystal cell was made by the sequence of procedures which were the same as in the Example 2 except changing the polyimide to a mixture of SE-2170 and SE-1211 at a ratio of about 20 to 1 and liquid crystal to E7 (Merck). The photomicrographs shown in FIGS. 7a and 7b indicate good alignment for the liquid crystal cell. The low birefringence of the bright state indicates a tilted liquid crystal alignment.

Example 5

Figure 8A:
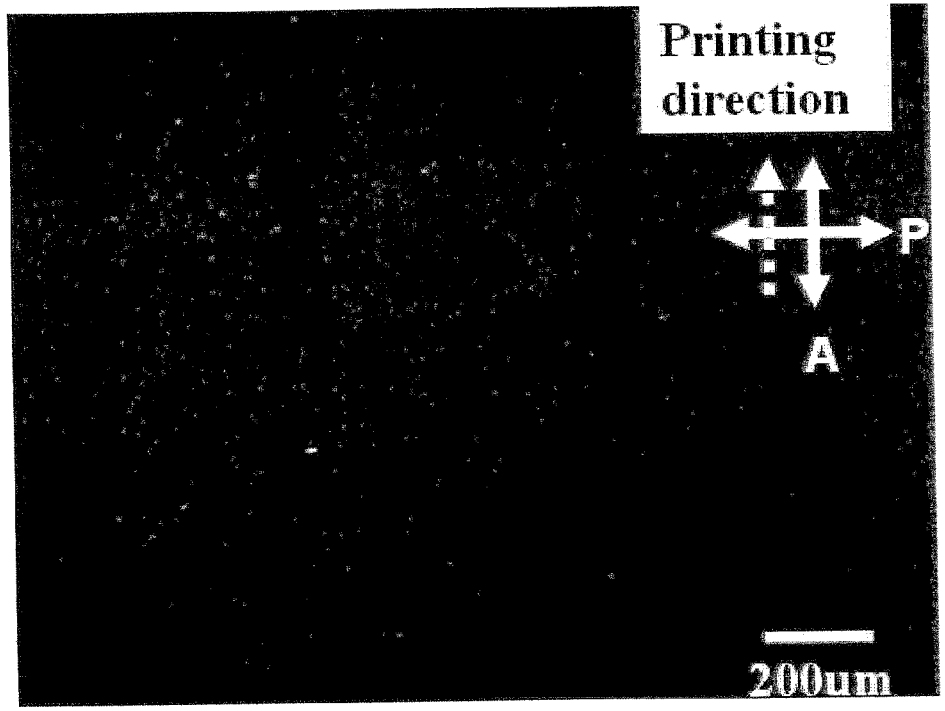
FIGS. 8a and 8b shows the photomicrographs of a cell with quality alignment prepared from a mixture of polyimides (SE-2170/SE 1211=10:1) having a tilted alignment.
Figure 8B:
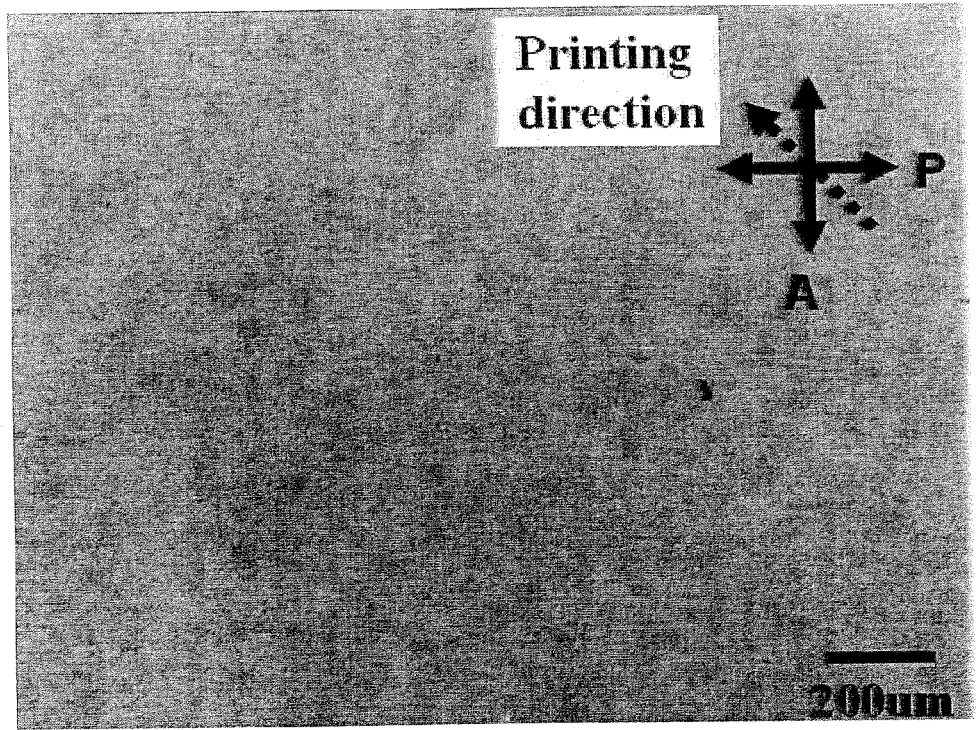

A liquid crystal cell was made by the sequence of procedures which were the same as in the Example 4 except changing the polyimide to a mixture of SE-2170 and SE-1211 at a ratio of about 10 to 1 and liquid crystal to E7 (Merck). The photomicrographs shown in FIGS. 8a and 8b indicate good alignment for the liquid crystal cell, and the further decrease in birefringence of the bright state because of a tilted liquid crystal alignment.

Example 6

Figure 9A:
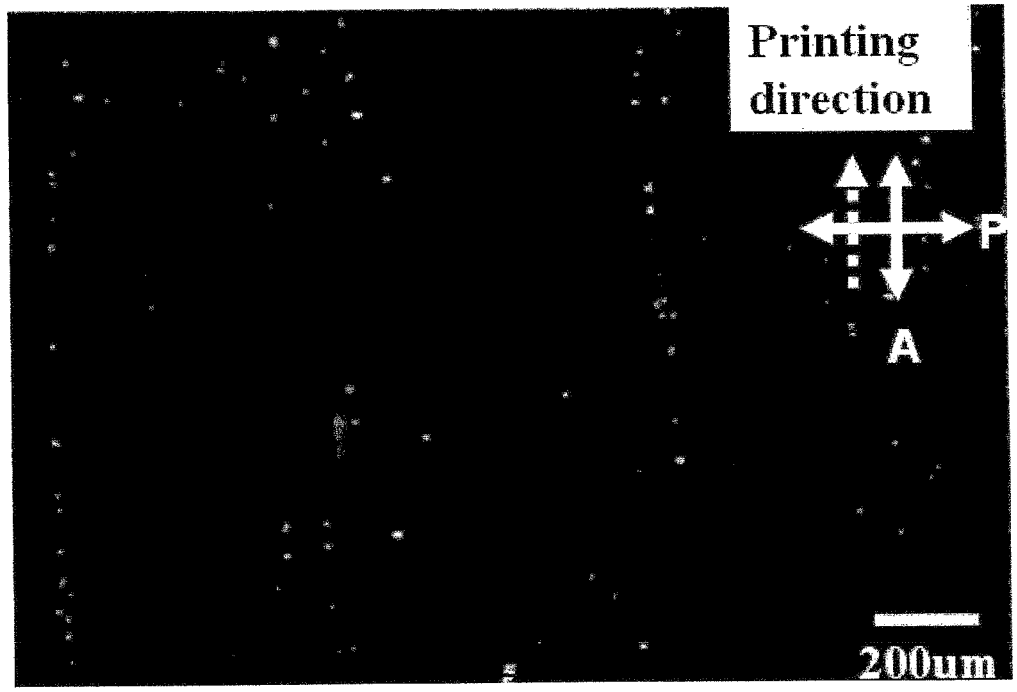
FIGS. 9a and 9b shows the photomicrographs of a cell with quality alignment prepared from homeotropic polyimide SE-1211 having a tilted homeotropic alignment.
Figure 9B:
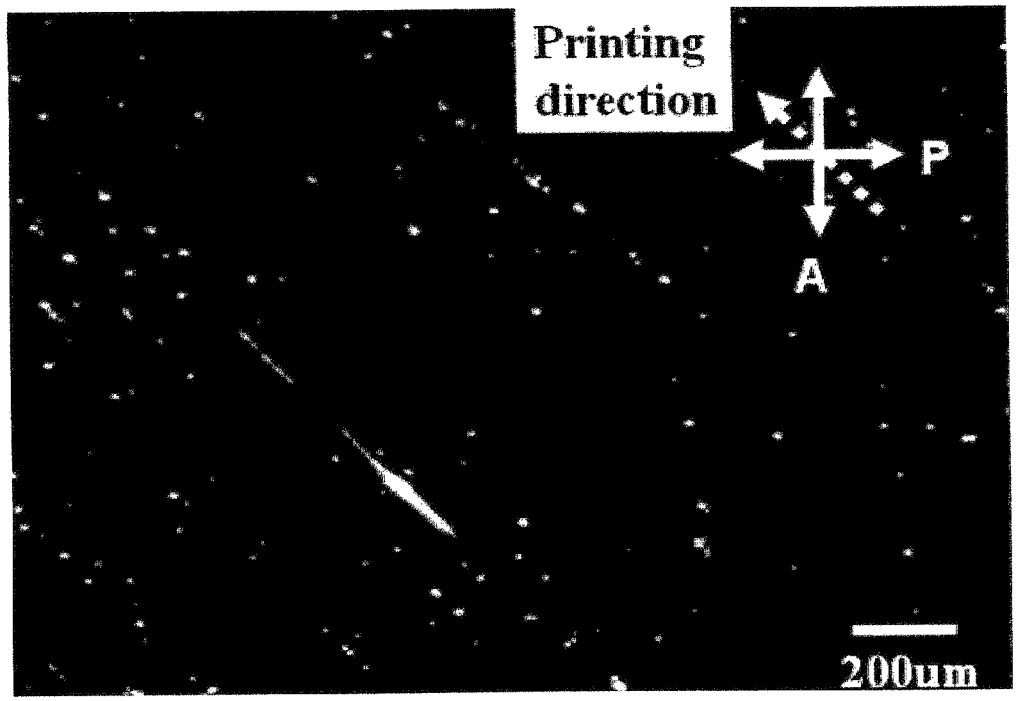

A liquid crystal cell was made by the sequence of procedures which were the same as in the Example 4 except changing the polyimide to SE-1211 and liquid crystal to E7 (Merck). The photomicrographs shown in FIGS. 9a and 9b indicate good alignment for the liquid crystal cell, and a preferable slightly tilted homeotropic alignment along the direction of printing.

As seen in FIG. 10a, a test cell 30 is shown with a patterned ITO electrode configuration forming a 5 mm by 5 mm pixel array, having patterned ITO portions 32. The patterned ITO portions 32 are shown in more detail in FIG. 10b, and include patterned ITO segments 34 with a polyimide layer 36 printed thereon according to the methods of the invention.

Figure 11A:
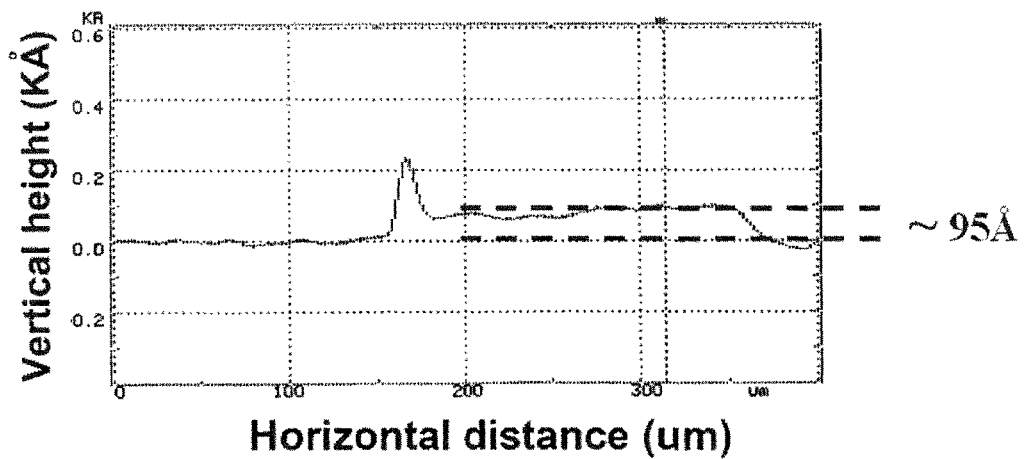
FIGS. 11a and 11b show graphs of the measured thickness of the printed polyimide layer according to examples.
Figure 11B:
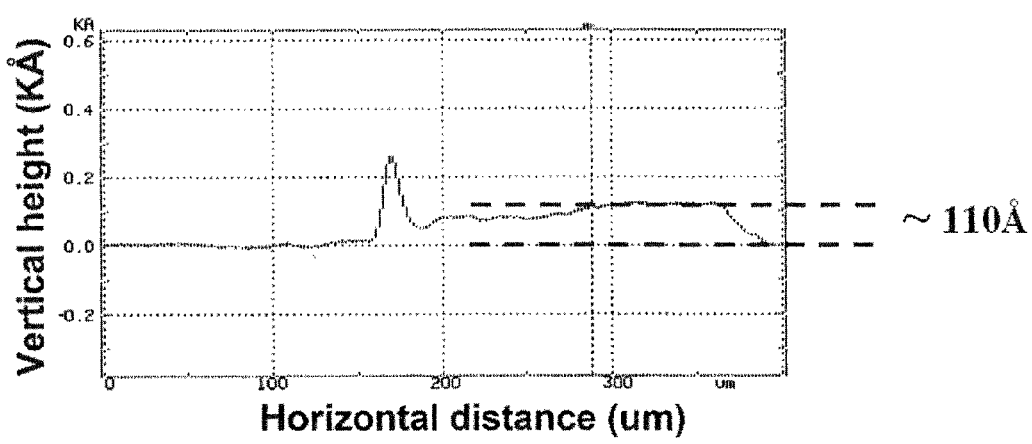

As seen in FIGS. 11a and 11b, the thickness of the printed polyimide layer is measured according to examples, indicating the general uniformity of the printed layer. In these examples, the polyimide material was the Nissan Chemical polyimide PI-SE2170, and the solution was at 0.8 weight percent, with the layers formed at a jetting voltage of 10 volts and a printing height of 0.78 mm. In these Figs., the thickness of the printed PI layer was substantially uniform across the layer and between printing examples.

Figure 12:
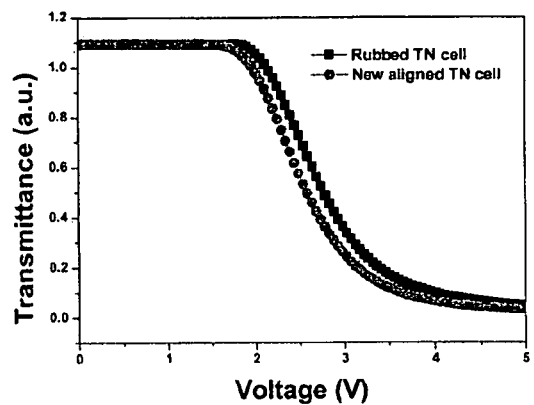
FIG. 12 is a representative graph depicting light transmission as a function of voltage for a non-contact liquid crystal cell and a rubbing aligned liquid crystal cell.

As seen in FIG. 12, light transmission is depicted as a function of the voltage applied in a newly aligned, non-contact twisted nematic liquid crystal cell and the rubbing-aligned twisted nematic liquid crystal cell which are both printed on an inkjet printed polyimide film. A similarly acceptable voltage-transmittance curve may be achieved in the newly aligned, non-contact twisted nematic liquid crystal cell compared with the rubbing-aligned twisted nematic liquid crystal cell on the printed PI film. The threshold voltage of the new aligned twisted nematic cell was lower than that of the rubbing-aligned twisted nematic cell on the printed polyimide film.

Figure 13:
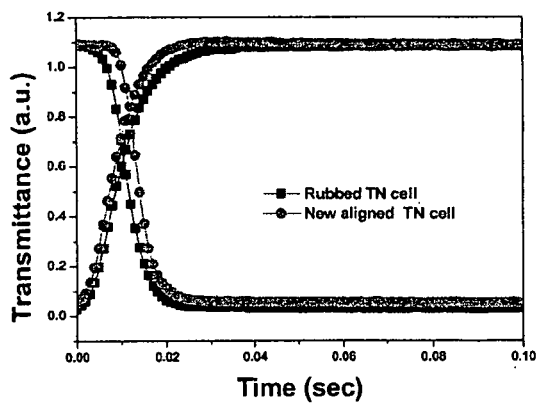
FIG. 13 is a representative graph depicting light transmission as a function of time for a non-contact aligned liquid crystal cell and a rubbing-aligned liquid crystal cell.

As seen in FIG. 13, the response time characteristics of a newly aligned, non-contact twisted nematic liquid crystal cell and a rubbing-aligned twisted nematic liquid crystal cell which are both printed on an inkjet printed polyimide film are shown. The response time of the newly aligned, non-contact twisted nematic liquid crystal cell on the printed polyimide was 20.1 ms (rising time: 7.8 ms, falling time: 12.2 ms) whereas the rubbing-aligned twisted nematic liquid crystal cell on the printed polyimide was 24.5 ms (rising time: 9.4 ms, falling time; 15.1 ms). Both cells showed fast and stable response time characteristics.

Figure 16:
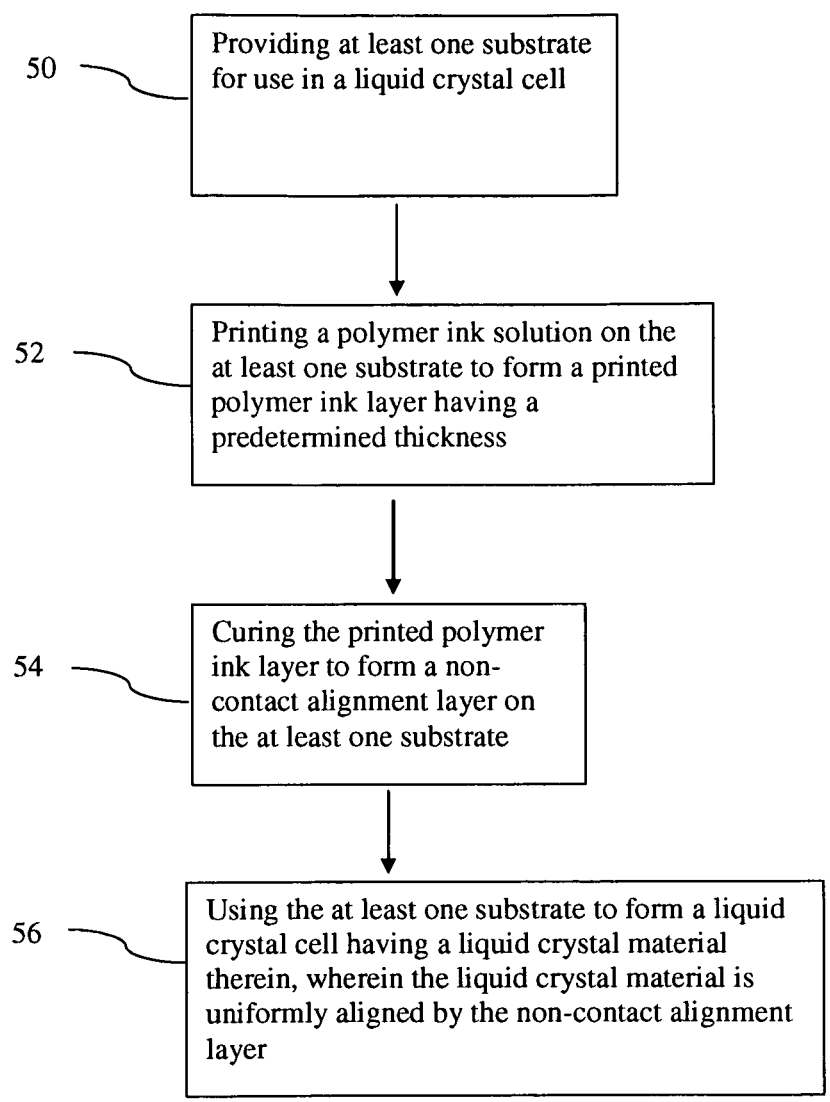
FIG. 16 shows a flow diagram of an alignment method for liquid crystal material.
Figure 17:
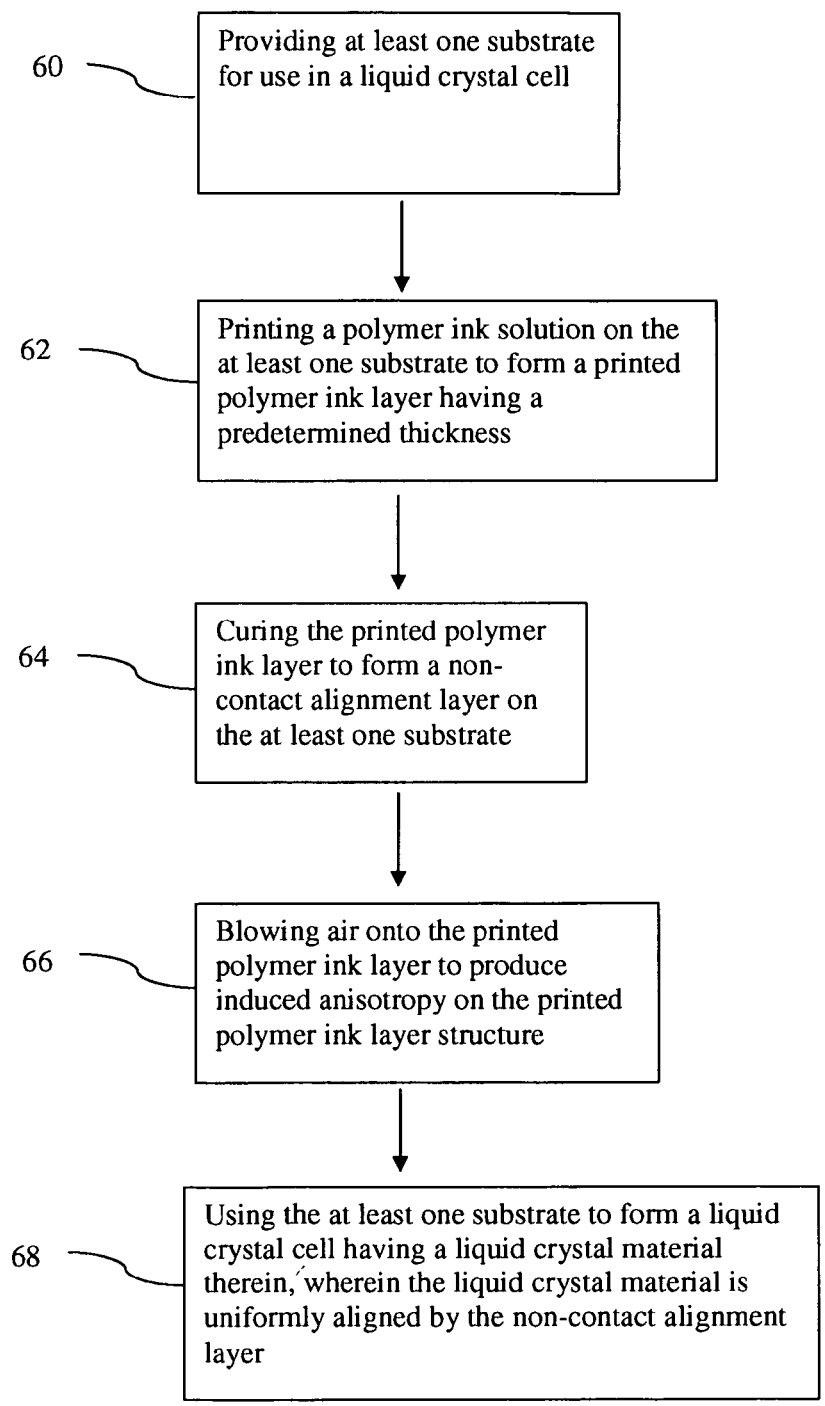
FIG. 17 shows a flow diagram of another alignment method for liquid crystal material.

In accordance with an embodiment of the invention as seen in FIG. 16, the method may comprise providing at least one substrate for use in a liquid crystal cell at 50, and printing a polymer ink solution on the at least one substrate to form a printed polymer ink layer having a predetermined thickness at 52. The printed polymer ink layer is cured to form a non-contact alignment layer on the at least one substrate at 54, and the at least one substrate as used to form a liquid crystal cell having a liquid crystal material therein, wherein the liquid crystal material is uniformly aligned by the non-contact alignment layer at 56. As in an alternative embodiment, as shown in FIG. 17, the method comprises providing at least one substrate for use in a liquid crystal cell at 60, printing a polymer ink solution on the at least one substrate to form a printed polymer ink layer having a predetermined thickness at 62. Thereafter, the printed polymer ink layer is cured to form a non-contact alignment layer on the at least one substrate at 64, and air in blown onto the printed polymer ink layer to produce induced anisotropy on the printed polymer ink layer surface at 66. Thereafter, the at least one substrate may be used to form a liquid crystal cell having a liquid crystal material therein wherein the liquid crystal material is uniformly aligned by the non-contact alignment layer. In this method, the blowing of air in step 66 may be performed in any suitable manner, but an easy approach is to provide air-assisted (aa) alignment using an empty cartridge for overprinting the polymer ink layer using an empty cartridge in the inkjet printing system. The air blowing from the nozzle of the inkjet printing cartridge provides induced anisotropy on the printed polymer ink surface for enhancing liquid crystal alignment. To enhance the effect, the firing voltage from the inkjet printing system may be increased, such that air is blown with some force from the empty cartridge during an overprinting process. The blowing of air onto the printed polymer ink layer enhances induction of nano-scale grooves to form the non-contact alignment layer on the printed substrate. The firing voltage, speed and number of nozzles in the inkjet system may be optimized for the air-assisted alignment using an empty cartridge printing to form the nano-scale grooves on the printed alignment film.

In general, the air-assisted alignment method and printed polyimide films as alignment layers presented herein, including the air-assisted alignment method are suitable for application to twisted nematic liquid crystal displays. A substantially uniform liquid crystal alignment was achieved by using this non-contact, inkjet printing methods. The pretilt angle generated on printed alignment layer using the alignment methods was almost substantially the same as that on an alignment layer using a rubbing alignment method. The liquid crystal alignment effects and the electro-optic performance characteristics of the twisted nematic cells on the inkjet printed alignment layer show insignificant difference when compared to the rubbing-aligned twisted nematic liquid crystal cell.

Figure 14A:
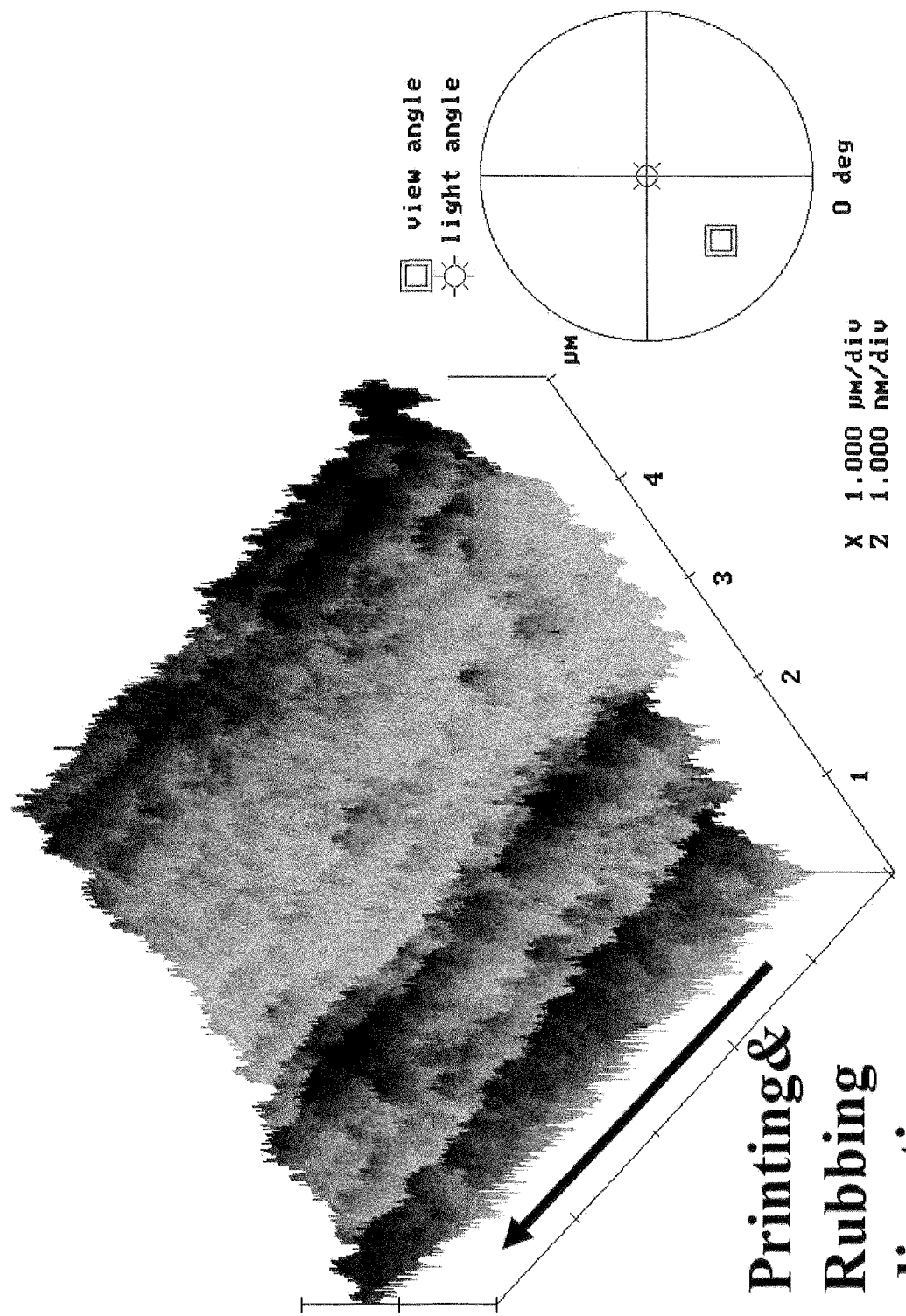
FIGS. 14a and 14b show a comparison of three-dimensional AFM images of rubbed PI alignment film in FIG. 14a and a non-rubbed PI alignment film made according to an example of the invention in FIG. 14b.
Figure 14B:
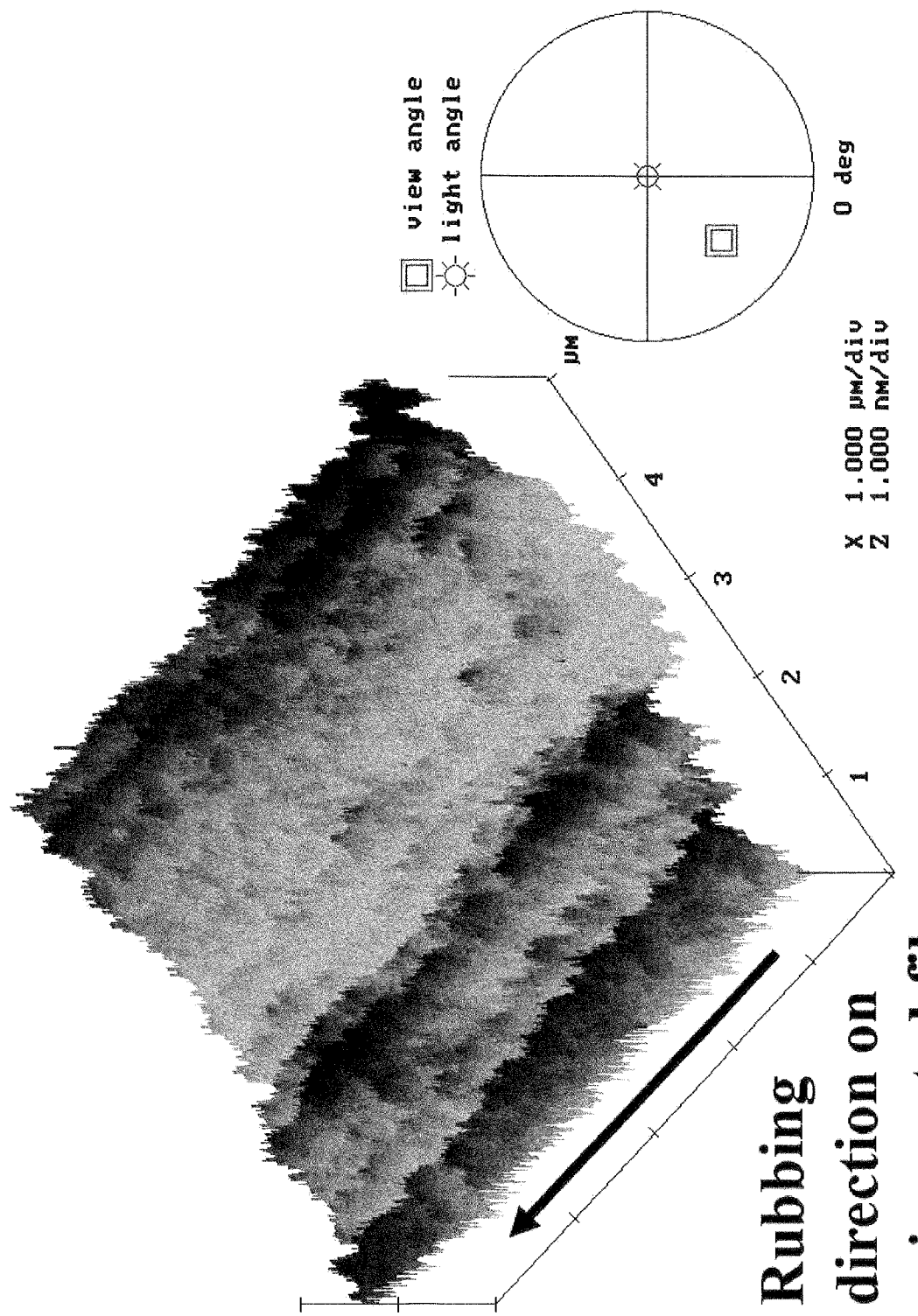

Turning to FIGS. 14a and 14b, there is shown a comparison of three-dimensional AFM images of a rubbed polyimide (PI) surface in FIG. 14a. The PI layer in these examples was formed of the commercially available Nissan Chemical polyimides PI-SE2170. In FIG. 14b, the PI layer is also formed of the commercially available Nissan Chemical polyimides PI-SE2170, but was formed by the printing techniques according to the invention, and was not rubbed. The non-contact alignment layer comprises micro-patterns that form a multi-domain structure. In this example, the non-contact PI alignment layer of FIG. 14b shows a substantially uniform surface configuration, with a groove-like structure forming a series of nano-scale hill and valley shaped modulations formed in an opposing direction to the printing direction, with the individual hill or valley groove-like modulations formed along the printing direction. The modulations are substantially uniform relative to one another across the printed PI layer. This is in contrast to the PI alignment layer with rubbing shown in FIG. 14a. As seen in FIG. 14a, the rubbed PI shows a groove like structure also, but there is large variation between the hill and valley groove type modulations relative to one another across the rubbed PI layer. The uniformity achieved by the printing process provides greater stability in alignment properties of the formed PI layer and more uniform and repeatable production of the desired PI alignment layer. This arrangement relates to the non-contact method described with reference to FIG. 17.

Figure 15:
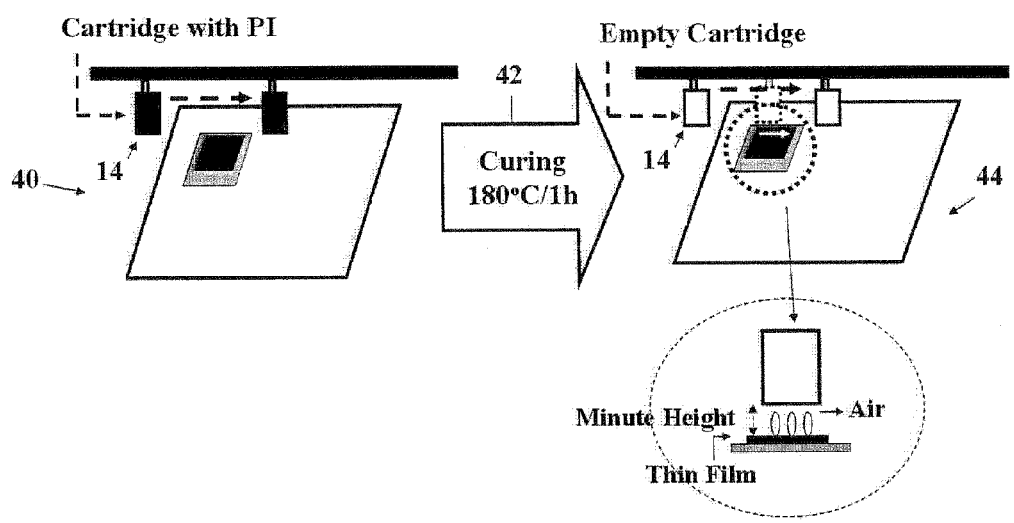
FIG. 15 shows a schematic diagram of an alignment method for liquid crystal material.

Turning to FIG. 15, an alignment method for liquid crystal material is shown. In a first step at 40, the PI layer 17 is printed by cartridge 14 having a PI solution therein, on the substrate 16, according to the method of the present invention. The PI layer is then cured as indicated at 42 and a further step 44 of forming LC alignment using a printing method is performed with an empty cartridge 14 to form LC alignment on the inkjet-printed PI layer.

Based upon the foregoing disclosure, it should now be apparent that the use of techniques and methods of preparing a non-contact alignment film for a liquid crystal material as described herein will provide significant advantages. The process provides a low cost method which eliminates the expensive photolithographic methods previously in use. The method provides a data driven alignment layer formation approach, which provides for example, flexibility for the design of replacing mask(s) in a simple and effective manner. The no contact application provides low impact on the object being printed, and thus may be more suitable for continuous fabrication processes using soft substrates for example. The methods are also not only suitable for formation of the PI alignment layer, but also the formation of conductive polymer layers, spacers and/or adhesives as part of a cell, polymer barrier walls or other structures of the LCD cell or display. The methods also provide for efficient use of materials, as the direct write techniques of the PI alignment layer and avoidance of rubbing provide effective formation of the layers without waste of material.

It is, therefore, to be understood that any variations evident fall within the scope of the claimed invention and thus, the selection of specific component elements can be determined without departing from the spirit of the invention herein disclosed and described.

What is claimed is:

1. A method of preparing a non-contact alignment layer for a liquid crystal material, the method comprising the steps of:
   providing at least one substrate;
   providing a polymer solution having a predetermined viscosity and concentration in an inkjet cartridge;
   printing at least one layer of the polymer solution onto the substrate with an inkjet printer to form a printed polymer alignment layer having a predetermined thickness; and
   curing the printed polymer alignment layer to form a non-contact alignment layer on the printed substrate.

2. The method of claim 1 further comprising the step of:
   printing the at least one layer to form at least one predetermined tilt angle in the printed polymer alignment layer.

3. The method of claim 1, further comprising the step of:
   forming nano-scale grooves in the polymer alignment layer.

4. The method of claim 3, wherein the application of blown air forms the nano-scale grooves.

5. The method of claim 4, wherein after inkjet printing of the polymer solution, air is blown over the inkjet printed polymer by overprinting of the printed polymer alignment layer by use of an empty inkjet cartridge in the inkjet printer to form nano-scale grooves therein.

6. The method of claim 5, wherein the step of overprinting is performed at a higher firing voltage than the step of printing the at least one layer of the polymer solution.

7. The method of claim 1 further comprising the steps of:
   forming a liquid crystal cell assembly, wherein the liquid crystal cell assembly comprises a plurality of spaced apart printed substrates aligned in a predetermined manner; and
   loading a liquid crystal material into the liquid crystal cell assembly.

8. The method of claim 7, wherein the liquid crystal material is selected from the group consisting of a nematic, smectic, bent-core smectic, ferroelectric, cholesteric or combinations of these liquid crystal materials.

9. The method of claim 8, wherein the liquid crystal is a twisted nematic liquid crystal.

10. The method of claim 1, wherein the polymer solution is at least one polyimide solution.

11. The method of claim 10, wherein a plurality of polyimide solutions are used to form the polymer solution, and the polyimide solutions are mixtures prepared at ratios selected from the group consisting of 1:1, 5:1, 10:1 and 20:1.

12. The method of claim 10, wherein the polyimide solution provides alignments selected from the group consisting of high pretilt, low-pretilt homeotropic, homeotropic and mixtures thereof.

13. The method of claim 1, wherein the inkjet printer has a firing voltage and the thickness of the printed polymer ink layer is adjustable by adjusting the firing voltage of the inkjet printer.

14. The method of claim 1, wherein the thickness of the printed polymer ink layer is modified by adjusting a parameter selected from the group consisting of the concentration of the polymer ink solution, the volume of polymer ink solution printed onto the substrate, and the height between the inkjet cartridge and the substrate or combinations thereof.

15. The method of claim 1, wherein the printed polymer ink layer comprises two or more layers in selected combination on one substrate or a plurality of spaced-apart substrates.

16. The method of claim 1, wherein the non-contact alignment layer comprises micro-patterns that form a multi-domain structure.

17. A method of forming a liquid crystal cell assembly comprising:
   at least one substrate having an alignment layer thereon, the alignment layer formed by applying a polymer solution to a surface of the at least one substrate, the polymer solution having a predetermined viscosity and is applied using an inkjet printer in a non-contact operation, wherein the polymer solution is cured to have a predetermined thickness and at least one predetermined tilt angle, and
   loading a liquid crystal material into the liquid crystal cell assembly adjacent the alignment layer.

18. A method of preparing an alignment layer for a liquid crystal assembly comprising:
   providing at least one substrate,
   inkjet printing of a polymer solution having a viscosity to be applied by a print cartridge of an inkjet printer, onto the at least one substrate,
   curing the inkjet printed polymer solution on the at least one substrate to form an alignment layer with no contact thereof, and
   providing a liquid crystal material in association with the alignment layer substantially uniformly aligned by the alignment layer.

* * * * *

UNITED STATES PATENT AND TRADEMARK OFFICE
CERTIFICATE OF CORRECTION

| | | |
|---|---|---|
| PATENT NO. | : 8,564,750 B2 | Page 1 of 1 |
| APPLICATION NO. | : 12/167754 | |
| DATED | : October 22, 2013 | |
| INVENTOR(S) | : Chien et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 336 days.

Signed and Sealed this
Thirty-first Day of March, 2015

Michelle K. Lee
*Director of the United States Patent and Trademark Office*